(12) United States Patent
Collet et al.

(10) Patent No.: US 7,484,170 B2
(45) Date of Patent: Jan. 27, 2009

(54) SYSTEM AND METHOD FOR FORMATTING SOURCE TEXT FILES TO BE IMPORTED INTO A SPREADSHEET FILE

(75) Inventors: Jean-Luc Collet, La Gaude (FR);
Jean-Christophe Mestres, Vence (FR);
Carole Truntschka, St. Laurent du Var (FR)

(73) Assignee: International Business Machines Corporation, Armonk, NY (US)

( * ) Notice: Subject to any disclaimer, the term of this patent is extended or adjusted under 35 U.S.C. 154(b) by 430 days.

(21) Appl. No.: 10/615,505

(22) Filed: Jul. 8, 2003

(65) Prior Publication Data

US 2005/0022111 A1    Jan. 27, 2005

(30) Foreign Application Priority Data

Jul. 11, 2002  (EP) ................................. 02368077

(51) Int. Cl.
*G06F 17/00*  (2006.01)

(52) U.S. Cl. ....................... 715/212; 715/209; 715/250; 705/1

(58) Field of Classification Search ................. 715/504, 715/212–226, 762–764
See application file for complete search history.

(56) References Cited

U.S. PATENT DOCUMENTS

| | | | | | |
|---|---|---|---|---|---|
| 5,231,577 | A | * | 7/1993 | Koss | 715/504 |
| 5,303,379 | A | * | 4/1994 | Khoyi et al. | 717/166 |
| 5,369,778 | A | * | 11/1994 | San Soucie et al. | 707/103 R |
| 5,421,012 | A | * | 5/1995 | Khoyi et al. | 718/107 |
| 5,421,015 | A | * | 5/1995 | Khoyi et al. | 718/107 |
| 5,634,124 | A | * | 5/1997 | Khoyi et al. | 707/103 R |
| 2006/0053383 | A1 | * | 3/2006 | Gauthier et al. | 715/764 |

* cited by examiner

*Primary Examiner*—Doug Hutton
*Assistant Examiner*—Quoc A Tran
(74) *Attorney, Agent, or Firm*—Norman L. Gundel; Hoffman Warnick LLC

(57) ABSTRACT

A computer implemented system and method for providing importation of a source text file into a spreadsheet file. A file format profile manager dynamically links a file format profile to the source text file, such that the formatting process performed after the importation operation is dynamically tailored to the source text file. A file format profile editor allows a user to formally describe the formatting actions to be performed for a given file format profile. A spreadsheet file user profile maintains location links between the imported source text files and their location within the spreadsheet file.

11 Claims, 5 Drawing Sheets

FIG. 5

SYSTEM AND METHOD FOR FORMATTING SOURCE TEXT FILES TO BE IMPORTED INTO A SPREADSHEET FILE

TECHNICAL FIELD

The present invention relates to spreadsheets in general and in particular to a system and method for formatting source text files to be imported into a spreadsheet file.

BACKGROUND OF THE INVENTION

In recent years, electronic spreadsheet programs have become well known tools for manipulating information on a computer. A conventional non-electronic spreadsheet could be defined as text or numeric data, arranged in a row-and-columns format.

An electronic spreadsheet program allows a user to create, modify and display spreadsheets. It also uses a two dimensional format, and manipulates various types of data, such as date, time, text, and numeric values. A conventional electronic spreadsheet is organized as a plurality of 'Tabs' wherein in each Tab the intersection of a column and a row is named a cell. For each cell or a group of cells, formatting instructions could be applied to perform additional treatments or to define style parameters such as width or color.

Although electronic spreadsheet programs have many advantages, they still require a non negligible amount of time for repetitive and tedious work especially for importation of data from source text files.

The following patents illustrate several solutions for reducing the time required to repeat those actions in conventional electronic spreadsheet programs.

U.S. Pat. No. 5,231,577 from Koss discloses a method and system for processing formatting information in a spreadsheet, relating to the field of computer systems, and more specifically, to a method and system for enhancing the performance of a spreadsheet application.

U.S. Pat. No. 5,566,068 from Ross discloses a method and system for identifying fields within input data, and more specifically for locating field breaks within input data.

U.S. Pat. No. 5,033,009 from Dubnoff discloses a system for generating worksheet files for electronic spreadsheets that offer automation of repetitive action to be performed with a technique for generating worksheet files of the type used by electronic spreadsheets.

While the above-described systems each address the aforementioned problem, nevertheless none offers a general solution to the successive importation into a single spreadsheet of multiple source text files having specific formats. The present invention solves this problem.

SUMMARY OF THE INVENTION

In view of the foregoing and other problems of the conventional systems and methods, the present invention provides a system and method for managing the importation of source text files of any format. The present invention also provides a system and method for maintaining source text format profiles for further computational treatments.

A computer implemented system and method for providing importation of a source text file into a spreadsheet file is disclosed. A file format profile manager dynamically links a file format profile to the source text file, such that the formatting process performed after the importation operation is dynamically tailored to the source text file. A file format profile editor allows a user to formally describe the formatting actions to be performed for a given file format profile. A spreadsheet file user profile maintains location links between the imported source text files and their location within the spreadsheet file.

In one embodiment of the present invention, a file format profile to be associated to a source text file to be imported into a spreadsheet is selected within a database of existing file format profiles. The file format profile includes at least one identifier with a corresponding formatting instruction. A source-format link is then created between the source text file and the selected file format profile, and the source text file is conventionally imported into the spreadsheet file using the import function of the spreadsheet program. Next, a location link is created between the imported source text file and its location in the spreadsheet file, and finally the selected file format profile is applied to the imported source text file by using the source-format link and the location link.

BRIEF DESCRIPTION OF THE DRAWINGS

The above and other features and advantages of the invention will be better understood by reading the following more particular description of the invention in conjunction with the accompanying drawings wherein:

FIG. 5 illustrates an importation process in accordance with the present invention.

DETAILED DESCRIPTION OF THE INVENTION

Figure 1:
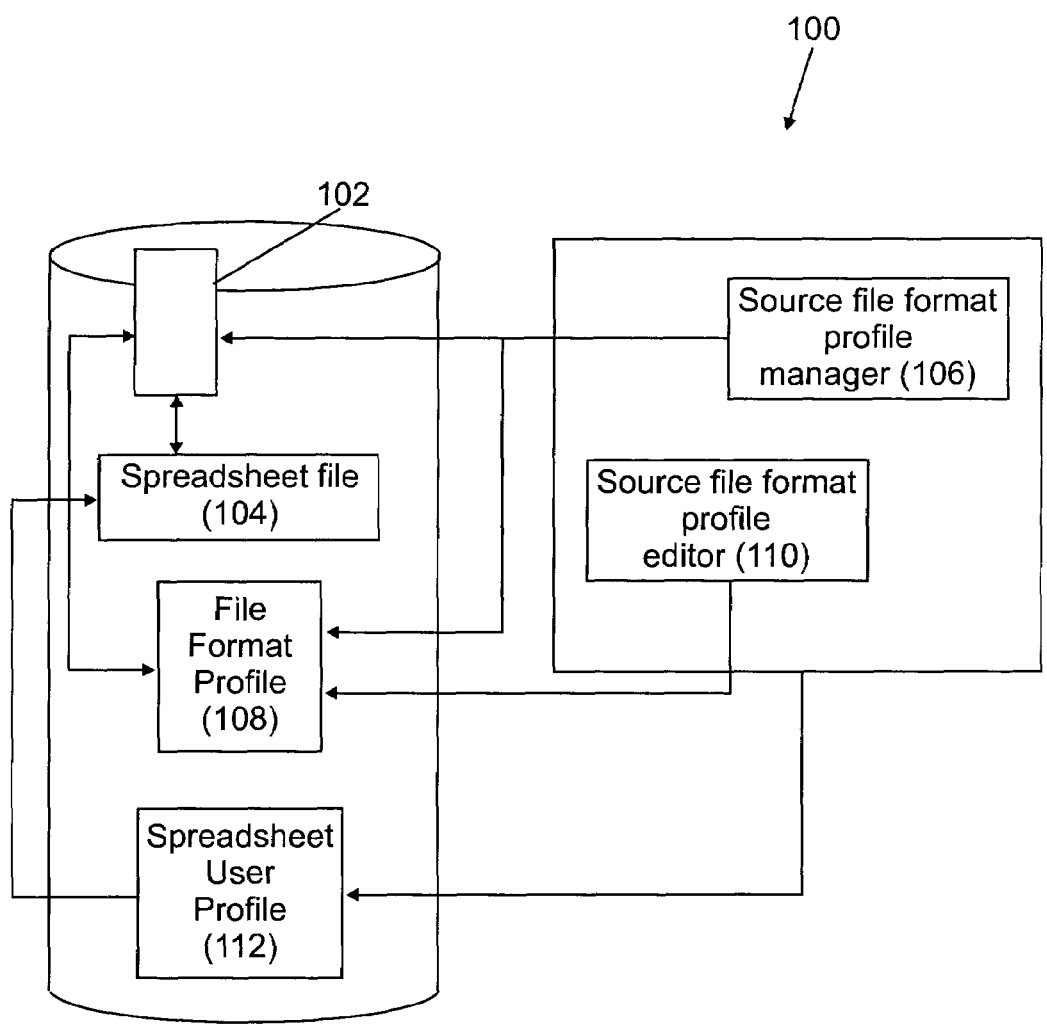
FIG. 1 is a conceptual view of the system of the present invention.

FIG. 1 shows a general conceptual view of a system 100 of the present invention. System 100 comprises a source text file 102 to be imported into a spreadsheet file 104. The source text file is dynamically coupled to a file format profile 108 through a source file format profile manager 106. A format profile editor 110 is coupled to the source file format profile manager 106. The format profile editor 110 allows a user to formally describe the operations to be processed by a given file format profile 108. A spreadsheet file user profile 112 is used by the source file format profile manager 106 to maintain a location link between the source text file 102 and the spreadsheet file 104.

Each element of the system 100 is now detailed. First, it is to be noted that the source text file 102 may be a file directly created by any text editor or may be any file recognized by a spreadsheet program as a text file. The spreadsheet file receiving the source text file may be a spreadsheet file created and/or modified and/or displayed by a spreadsheet program such as the well-known Excel from Microsoft or Lotus 1-2-3 from Lotus Corporation.

The source file format profile manager 106 is a routine which allows that the formatting process performed after a conventional operation of importation is dynamically tailored to the source text file based on the file format profile 108. It is to be appreciated that the conventional import operation is a source text file importation provided by the spreadsheet program currently used.

Figure 5:
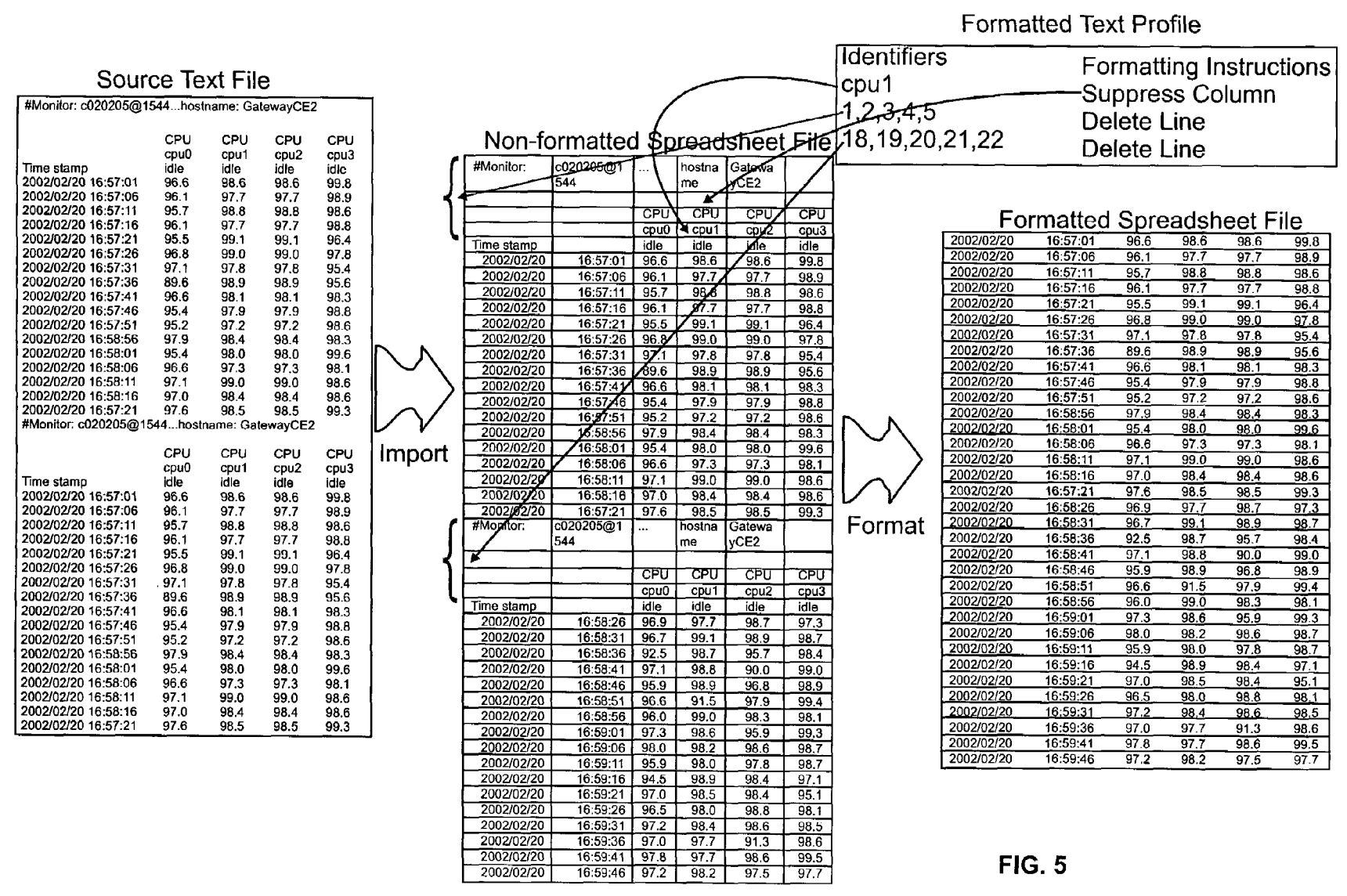

The file format profile 108 includes identifiers and formatting instructions to be used by the source file format profile manager 106 to format the resulting spreadsheet file. Each identifier recognized by the source file format profile manager 106 generates an action in the spreadsheet file. For example and as illustrated on FIG. 5, an identifier referenced in the source file format profile as 'cpu1' and having a corresponding action of 'Suppress Column' will cause the deletion of all columns that contain the keyword 'cpu1' in the resulting spreadsheet file. Similarly, the identifier referenced '1,2,3,4, 5' with corresponding action of 'Delete Line' will cause the suppression of the respective 'first, second, third, fourth, fifth' lines in the resulting spreadsheet file.

One skilled in the art will easily appreciate that a plurality and a variety of identifiers may be listed and have a wide variety of formatting actions, such as line(s) insertion, column(s) deletion, cell(s) copy, cell(s) paste, etc., but also any other actions that are available within a spreadsheet program such as text formatting, cell format change, and so on.

The content of the file format profile 108 may be either predefined as an existing preloaded configuration of the spreadsheet program, or may be completely created or modified directly by the user using the file format profile editor 110 as it will be further detailed with reference to FIG. 3.

The spreadsheet file user profile 112 contains the directory path to the source text files. Preferably, the directory path is set to the 'by-default' directory path which is used for the source text files importation, but other specific directory paths may be defined by the user in lieu of the 'by-default' one as described below with reference to FIG. 2.

Furthermore, the spreadsheet file user profile 112 also contains for each spreadsheet file, all location links with the imported source text files and their related locations and size within the spreadsheet file. The location of a source text file may be a standard definition such as for example the 'Tab' name or the 'row/column' cell references or any other parameter that locates an item within a spreadsheet file.

As mentioned above, for each imported source text file, a source-format link with the source file format profile that is used, is created and this relationship is maintained in the spreadsheet file user profile 112.

Figure 2:
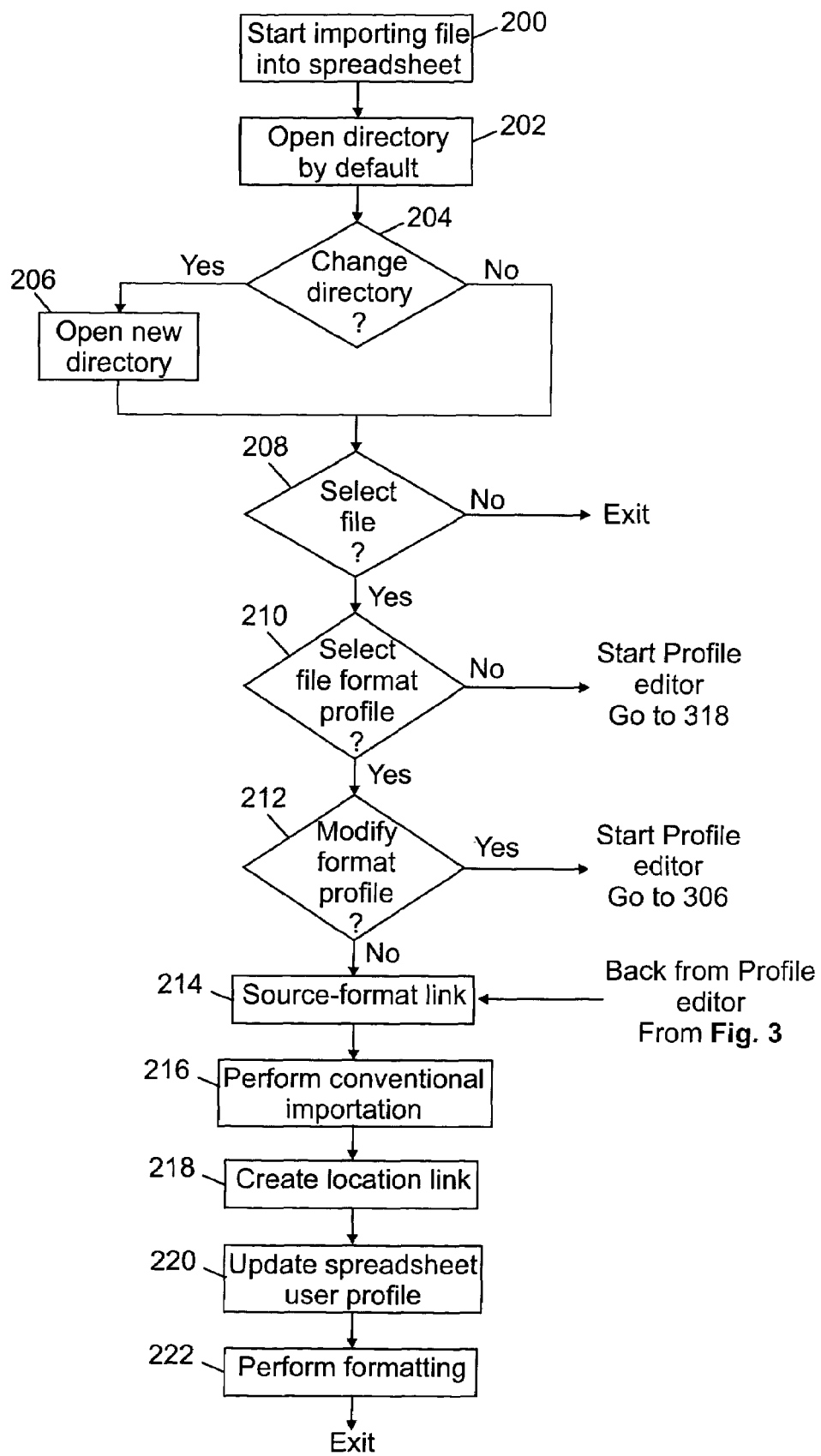
FIG. 2 is a flow chart of the main steps to realize an importation operation as defined by the present invention.

Referring now to FIG. 2, the main steps to realize an importation operation as defined by the present invention are described.

The process starts on step 200 with the selection of the import function of the present invention. While it is not described in detail, it is to be appreciated that the import function may be offered to a user as a standard action of a spreadsheet program menu.

On next step 202, the process allows the user to access all the source text files found in the 'by-default' directory which is defined in the spreadsheet user profile 112.

Next step 204 allows the user to select another local or remote directory if required. If a new directory is selected (branch YES), this directory is opened at step 206 and all the source text files found from this directory are available for the user. The process then branches to step 208.

If the selection of the 'by-default' directory is maintained (branch NO of step 204), then step 208 allows the user to select a source text file in the active directory.

It is to be noted that if no source text file is selected, the process ends, while if a source text file is selected, next step 210 allows the user to select a file format profile to be associated to the previously selected source text file.

If no file format profile is selected, the process starts the file format editor routine (on step 318 of FIG. 3) to offer to the user the possibility to create a new file format profile. A more detailed description of a file format creation is described below with reference to FIG. 3.

Referring again to step 210, if a file format profile is selected, then step 212 allows the user to modify the selected file format profile. If Yes, the editor routine is started (on step 306 of FIG. 3) otherwise on step 214, a source-format link is dynamically established by the source file format profile manager 106 between the selected source text file and the selected file format profile. This source-format link memorizes all the format actions to be applied to the spreadsheet after the importation in the spreadsheet of source text files associated to such source-format link.

As shown by the arrow on FIG. 2, step 214 may also be accessed back from the source file format profile editor if it has been started previously on steps 210 or 212.

Next on step 216, the import function of the source text file is started by the routine. Step 218 creates the location link between the imported source text file and its location in the spreadsheet. On step 220, this location link definition is saved into the spreadsheet user profile.

On final step 222, the formatting of the spreadsheet is processed by applying the file format profile to the spreadsheet file. The formatting instructions are then executed based on the identifiers contained in the file format profile. After formatting in step 222, the process exits.

Figure 3:
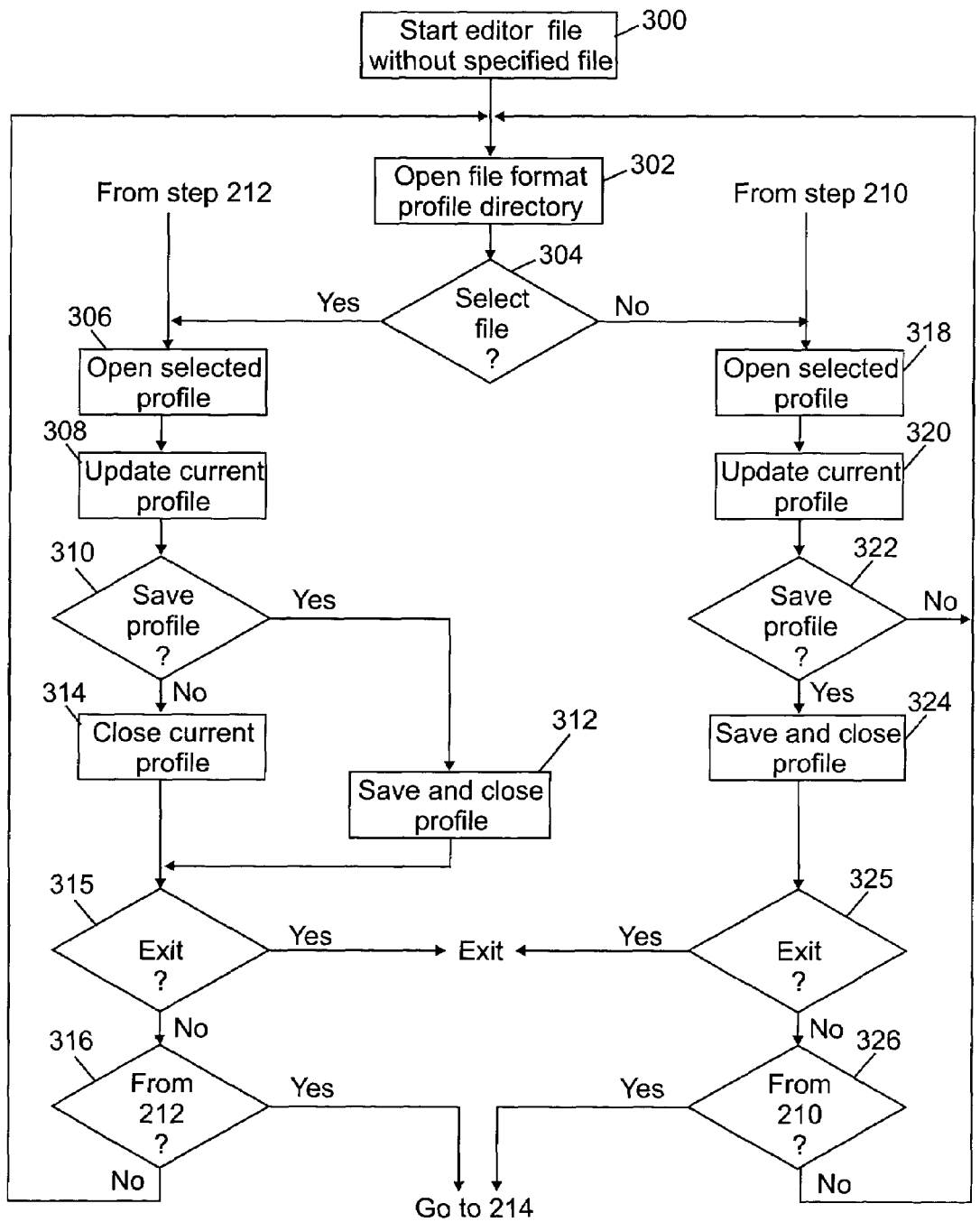
FIG. 3 is a flow chart of the main steps for a user to operate the file format profile editor of the present invention.

FIG. 3 illustrates the main steps for a user to operate the file format profile editor 110 of the present invention.

The process starts on step 300 with a user activating the file format profile editor. On next step 302, the process allows the user to access all file format profiles previously defined or installed and saved into a file format profile directory.

Step 304 allows the user to select a file format profile in the active directory. If a file format profile is selected (branch YES), then step 306 opens the selected file format profile. It is to be noted that as shown on FIG. 3, step 306 may be also accessed during a source text file importation as it has been previously indicated in the description of FIG. 2 (step 212).

Next step 308 allows the user to modify the file format profile. Step 310 allows the user to save the file format profile previously selected and modified.

If the save option is selected in step 310 (branch YES), then in step 312 the routine saves the updated profile and closes it. If the save option is not selected (branch NO), then in step 314 the current opened file format profile is closed without saving.

Then, either from steps 312 or 314, the routine continues with step 315. If the user selects to exit the file format profile editor during edition in step 315 (branch YES), then the process exits. Otherwise, the process continues with step 316, which checks whether the profile editor has been started independently or during an importation operation.

If the editor has been started by the user independently in step 316 (branch YES) then the process loops back directly to step 302, otherwise (branch NO) the process re-enters the importation process on step 214.

Referring again to step 304, if no file format profile is selected (branch NO), the file format editor routine offers the user the possibility to create a new file format profile in step 318.

It is to be noted that as shown on FIG. 3, step 318 may be also accessed during a source text file importation as it has been previously indicated in the description of FIG. 2 (step 210).

Step 320 allows the user to add identifiers and formatting instructions into the file format profile previously created.

Step 322 allows the user to save the file format profile previously created and modified.

If the save option is not selected in branch 322 (branch NO), the process loops back directly to step 302 without writing the new file format profile into the file format profile directory.

If the save option is selected in branch 322 (branch YES), then in step 324 the routine saves into the file format profile database the updated profile 108 and closes it. The routine continues with step 325. If the user selects to exit the file format profile editor during an edition (branch YES), then the process exit. Else, the process goes to next step 326 which checks whether the profile editor has been started independently or during an importation operation.

If the editor has been started by the user independently in step 326 (branch YES) then the process loops back directly to step 302, otherwise (branch NO) the process re-enters step 214.

Figure 4:
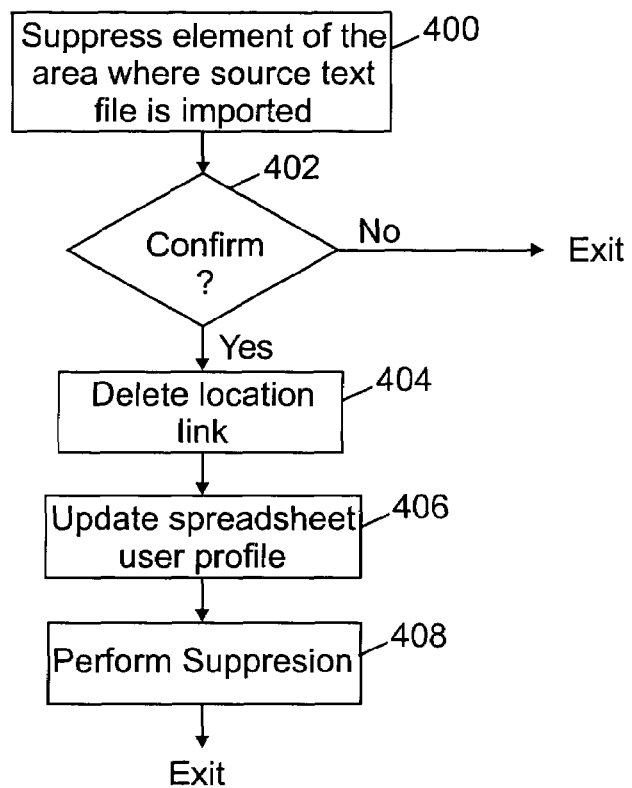
FIG. 4 is a flow chart illustrating the update operation of the spreadsheet user profile of the present invention.

Referring to FIG. 4, the routine 400 to suppress partially or totally an area of a spreadsheet where a source text file 102 has been imported is now described.

If the user selects a tab, or a zone (group or cells), a line, a column, and selects a delete option, a checking is performed that is based on the spreadsheet user profile 112. The checking verifies if the selected element is impacted by a location link, i.e., if the element is part of an area defined by the source text file location and size found into spreadsheet user profile 112.

One skilled in the art will easily appreciate that this routine optionally may begin with a first test 402 to allow the user to confirm the suppression operation. If the user does not confirm (branch NO), the process exit.

If the user confirms (branch Yes), next on step 404 the location link established on step 218 is deleted, and on step 406 the corresponding spreadsheet user profile is updated.

Finally, on step 408 the suppression of the items located into the spreadsheet file is performed, and the process exit.

It is to be appreciated by those skilled in the art that while the invention has been particularly shown and described with reference to a preferred embodiment thereof, various changes in form and details may be made without departing from the spirit and scope of the invention. Particularly, an additional feature to perform the checking of the user profile and the consistency of the location links maintained in it (i.e., The presence of files at the specified path) would be useful.

The invention claimed is:

1. A method for formatting a plurality of source text files each having specific formats to be imported into a single spreadsheet file comprising the steps of:
   a) selecting a user modifiable file format profile to be associated to each of the plurality of source text files, wherein each source text file comprises a file directly created by a text editor or recognized by a spreadsheet program as a text file, the plurality of file format profiles each including a plurality of identifiers each with a corresponding formatting instruction, wherein each identifier generates a unique action in the spreadsheet file, wherein the file format profile is configured to be used to format the single spreadsheet file;
   b) creating a source-format link between the plurality of source text files and the selected plurality of file format profiles,
   wherein the source-format link stores a format action applied to the spreadsheet file after an importing;
   c) importing the plurality of source text files into the single spreadsheet file after the creating the source-format link;
   d) creating a location link between the imported plurality of source text files and their locations into the single spreadsheet file after the importing, wherein the location link comprises a directory path of the source text files and contains a related location and a size of each of the imported plurality of source text files;
   e) storing the location link into a spreadsheet user profile database after the creating; and
   f) applying the selected plurality of file format profiles to the imported plurality of source text files by using the source-format link and the location link.

2. The method of claim 1 farther comprising before step a) a step of creating at least one file format profile including at least one identifier with a corresponding formatting instruction.

3. The method of claim 2 farther comprising a step of storing the created at least one file format profile into a file format profile database.

4. The method of claim 1 farther comprising after step a) the step of modifying the selected file format profile.

5. The method of claim 4 farther comprising a step of storing the modified selected file format profile into the file format profile database.

6. The method of claim 1 wherein the spreadsheet file is created by a spreadsheet program.

7. The method of claim 1 further comprising after step f) a step of deleting the location link.

8. The method of claim 7, further comprising updating a spreadsheet user profile to correspond with the deletion.

9. The method of claim 1, wherein the applying farther comprises executing a set of formatting instructions based on the at least one identifier contained in the file format profile.

10. A computer-implemented system for formatting a plurality of source text files each having specific formats to be imported into a single spreadsheet file, comprising
   at least one computer, including:
   a) a system for selecting a user modifiable file format profile to be associated to each of the plurality of source text files, wherein each source text file comprises a file directly created by a text editor or recognized by a spreadsheet program as a text file, the file format profile including a plurality of identifiers each with a corresponding formatting instruction, wherein each identifier generates a unique action in the spreadsheet file, wherein the file format profile is configured to be used to format the single spreadsheet file;
   b) a system for creating a source-format link between the source text file and the selected file format profile, wherein the source-format link stores a format action applied to the spreadsheet file after an importing;
   c) a system for importing the source text file into the single spreadsheet file after the creating;
   d) a system for creating a location link between the imported source text file and its location into the single spreadsheet file after the importing, wherein the location link comprises a directory path of the source text files and contains a related location and a size of each of the imported plurality of source text files;
   e) a system for storing the location link into a spreadsheet user profile database after the creating; and
   f) a system for applying the selected file format profile to the imported source text file by using the source-format link and the location link.

11. A computer program product stored on computer usable medium for formatting a plurality of source text files each having specific formats to be imported into a single spreadsheet file, comprising computer readable program means for causing a computer to perform the steps of:
   a) selecting a user modifiable file format profile to be associated to the source text file, wherein each source text file comprises a file directly created by a text editor or recognized by a spreadsheet program as a text file, the file format profile including a plurality of identifiers each with a corresponding formatting instruction, wherein each identifier generates a unique action in the spreadsheet file, wherein the file format profile is configured to be used to format the single spreadsheet file;

b) creating a source-format link between the source text file and the selected file format profile, wherein the source-format link stores a format action applied to the spreadsheet file after an importing;

c) importing the source text file into the single spreadsheet file after the creating the source-format link;

d) creating a location link between the imported source text file and its location into the single spreadsheet file after the importing, wherein the location link comprises a directory path of the source text files and contains a related location and a size of each of the imported plurality of source text files;

e) storing the location link into a spreadsheet user profile database after the creating; and f) applying the selected file format profile to the imported source text file by using the source-format link and the location link.

* * * * *